(12) United States Patent
Mizoguchi et al.

(10) Patent No.: US 7,907,317 B2
(45) Date of Patent: Mar. 15, 2011

(54) OPTICAL DEVICE, OPTICAL SCANNER, AND IMAGE FORMING APPARATUS

(75) Inventors: Yasushi Mizoguchi, Suwa (JP); Hirokazu Yamaga, Chino (JP)

(73) Assignee: Seiko Epson Corporation (JP)

( * ) Notice: Subject to any disclaimer, the term of this patent is extended or adjusted under 35 U.S.C. 154(b) by 0 days.

(21) Appl. No.: 12/711,557

(22) Filed: Feb. 24, 2010

(65) Prior Publication Data
US 2010/0245962 A1    Sep. 30, 2010

(30) Foreign Application Priority Data
Mar. 26, 2009    (JP) .................... 2009-075918

(51) Int. Cl.
*G02B 26/08* (2006.01)
(52) U.S. Cl. .................................... 359/200.7
(58) Field of Classification Search ........... 359/200.7, 359/223.1–226.1
See application file for complete search history.

(56) References Cited

U.S. PATENT DOCUMENTS
6,937,121 B2 *   8/2005   Norimatsu ............... 359/220.1
2009/0073526 A1    3/2009   Uchikawa

FOREIGN PATENT DOCUMENTS
JP    06-82711    3/1994
JP    2009-69457    4/2009

* cited by examiner

*Primary Examiner* — Euncha P Cherry
(74) *Attorney, Agent, or Firm* — Harness, Dickey & Pierce, P.L.C.

(57) ABSTRACT

An optical device includes: a movable plate disposed in a distribution range of light input from outside, and having a light reflecting surface adapted to reflect the light; a shaft member adapted to support the movable plate so that the movable plate can swing around a predetermined axis; a ferromagnetic member provided to the movable plate; and a drive section configured to generate electromagnetic force between the drive section and the ferromagnetic member to thereby swing the movable plate, wherein a portion of the drive section, included in the distribution range of the light, is formed of a surface having a normal vector with which the light is reflected to outside of a predetermined range.

5 Claims, 5 Drawing Sheets

OPTICAL DEVICE, OPTICAL SCANNER, AND IMAGE FORMING APPARATUS

The entire disclosure of Japanese Patent Application No: 2009-075918, filed Mar. 26, 2009 is expressly incorporated by reference herein.

BACKGROUND

1. Technical Field

Some aspects of the present invention relate to an optical device, an optical scanner, and an image forming apparatus manufactured using, for example, a micro electro mechanical system (MEMS) technology, and provided with a movable plate reciprocating around a shaft member.

2. Related Art

In the related art, as an optical device of this kind, there has been known a device provided with a magnetic field generating section and a scanning mirror supported on the both ends thereof with a support member so as to be able to perform angular displacement around a drive axis, wherein the scanning mirror is provided with a mirror surface formed on one surface thereof and a permanent magnet formed on the other surface, and the magnetic field generating section is disposed on the other surface side of the scanning mirror with a predetermined distance from the scanning mirror. Since in this optical device with the configuration described above the scanning mirror is driven separately and in the light-weight condition only with the thin film permanent magnet formed on the other surface thereof, it can easily be driven with relatively weak drive force even in the case in which the size of the scanning mirror is large (see, e.g., JP-A-6-82711).

Incidentally, since the distribution range of light entering the optical device is generally larger than the size of the movable plate having the light reflecting surface (the mirror), there have been the prominent cases in which the light enters the portion of the optical device other than the movable plate, in particular a drive section disposed in the vicinity of the movable plate and for generating electromagnetic force in a space between the drive section and a ferromagnetic member provided to the movable plate to thereby swing the movable plate. In this case, the light entering the drive section does not move even when the movable plate is driven (to scan the light), and is therefore always reflected to the same position. As a result, there has been a possibility that the light entering the drive section appears as so-called stray light in, for example, the range of the reflected light by the movable plate, other optical devices including the range of the reflected light, mirrors, a screen (including a screen illuminated via the other optical devices, the mirrors, and so on). It should be noted that since a coil made of a metal material with high reflectance, for example, is often used as the drive section, it is possible to provide black coating on the surface of the coil in order for preventing the reflected light. However, according to this method, since the stray light itself still appears although the intensity of the stray light can be reduced, the method cannot be called a radical solution.

SUMMARY

An advantage of some aspects of the invention is to provide an optical device, an optical scanner, and an image forming apparatus capable of reducing the stray light caused by the light entering the drive section.

According to an aspect of the invention, there is provided an optical device including a movable plate disposed in a distribution range of light input from outside, and having a light reflecting surface adapted to reflect the light, a shaft member adapted to support the movable plate so that the movable plate can swing around a predetermined axis, a ferromagnetic member provided to the movable plate, and a drive section configured to generate electromagnetic force between the drive section and the ferromagnetic member to thereby swing the movable plate, and a portion of the drive section, included in the distribution range of the light, is formed of a surface having a normal vector with which the light is reflected to outside of a predetermined range.

According to the configuration described above, the portion of the drive section inside the distribution range of the light is composed of a surface having the normal vector (a specified normal vector) with which the light input from the outside is reflected to the outside of the predetermined range. In general, since it is known that the incident angle and the reflection angle of the light are equal to each other with respect to the normal vector (the normal line) of the reflecting surface, it is possible to change the incident angle and the reflection angle of the light by changing the direction of the normal vector of the reflecting surface with respect to the incident light. Therefore, it becomes possible to reflect the incident light to the outside of the predetermined range by setting the angle formed between the light input from the outside and the normal vector of the reflecting surface, namely the incident angle of the light, to be an appropriate value. Thus, the stray light caused by the light input to the drive section can be reduced. The "predetermined range," which the reflected light from the drive section should miss, includes the range of the reflected light by the movable plate, other optical devices including the range of the reflected light, mirrors, a screen (including a screen illuminated via the other optical devices, the mirrors, and so on), and so on.

Preferably, the surface having the specified normal vector described above includes a plane having a predetermined angle with the movable plate.

According to the configuration described above, the surface having the specified normal vector described above includes a plane having a predetermined angle with the movable plate. Here, the plane having the predetermined angle with the movable plate can be obtained by executing, for example, anisotropic etching or cutting work using a machine on a surface parallel to the movable plate. Therefore, it becomes possible to use the plane as the surface having the specified normal vector described above by setting the predetermined angle to be an appropriate value. Thus, the surface having the specified normal vector described above can easily be formed in the portion of the drive section inside the distribution range of the light.

Preferably, the ferromagnetic member is a permanent magnet, and the drive section includes a coil disposed at a position opposed to the permanent magnet with a predetermined distance from the permanent magnet, and an alternating current signal generator adapted to supply the coil with an alternating current signal.

According to the configuration described above, the drive section includes a coil disposed at a position opposed to the permanent magnet with a predetermined distance from the permanent magnet, and an alternating current signal generator adapted to supply the coil with an alternating current signal. Here, since the coil is disposed at the position opposed to the permanent magnet, it is possible to efficiently generate the electromagnetic force between the coil and the permanent magnet. Further, since the coil is disposed with the predetermined distance from the permanent magnet, it becomes possible to dispose the coil without interfering the swinging movement of the movable plate even in the case in which the upper surface of the coil is tilted, for example, so as to have the predetermined angle with the movable plate.

Preferably, the plane having a predetermined angle is tilted in a direction perpendicular to the direction of the magnetic field of the permanent magnet.

According to the configuration described above, since the plane having the predetermined angle is tilted in the direction perpendicular to the direction of the magnetic field of the permanent magnet, there is very little variation between the distance between the plane having the predetermined angle and the north pole of the permanent magnet, and the distance between the plane having the predetermined angle and the south pole of the permanent magnet, and therefore, the force (the torque) acted by the magnetic field, which is generated by the coil, on the north pole and the south pole of the permanent magnet becomes approximately equal. Thus, it becomes possible to reduce the stray light caused by the light input to the drive section, and at the same time swing the movable plate with low power consumption.

Preferably, a substrate including a plane having the specified normal vector is further provided, and the coil is mounted on the plane.

According to the configuration described above, since the coil is mounted on the plane of the substrate having the specified normal vector described above, the upper surface of the coil also becomes a plane having the specified normal vector. Thus, the plane having the specified normal vector described above can easily be formed in the portion of the upper surface of the coil inside the distribution range of the light.

Preferably, the predetermined range described above includes the reflection range of the light reflected by the movable plate.

According to the configuration described above, since the predetermined range includes the reflection range of the light reflected by the movable plate, the incident light to the portion of the drive section inside the distribution range of the light input from the outside is reflected to the outside of the reflection range of the light reflected by the movable plate. In other words, the reflection range of the light reflected by the movable plate and the reflection range of the light reflected by the drive section do not overlap with each other. Thus, the possibility that the light input to the drive section appears in the reflection range of the light by the movable plate as stray light can be reduced.

According to another aspect of the invention, there is provided an optical scanner including the optical device according to the aspects of the invention described above.

According to the configuration described above, since the optical device according to any one of the aspects of the invention described above is provided, the stray light caused by the light input to the drive section can be reduced. Thus, the need for lowering the resolution for making the stray light less noticeable or lowering the contrast of the light input from the outside in the optical device of the related art can be eliminated. Therefore, it becomes possible to realize an optical scanner having superior optical characteristics capable of raising the resolution and raising the contrast of the light input from the outside compared to the optical device of the related art.

According to still another aspect of the invention, there is provided an image forming apparatus including the optical scanner according to the aspect of the invention described above.

According to the configuration described above, since the optical scanner according to the aspect of the invention described above is provided, the resolution can be raised and the contrast of the light input from the outside can also be raised compared to optical devices of the related art. Thus, it becomes possible to realize the image forming apparatus having superior drawing characteristics capable of forming high-resolution and high-contrast images.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, some embodiments of the invention will be explained with reference to the accompanying drawings.

Optical Device

Figure 1:
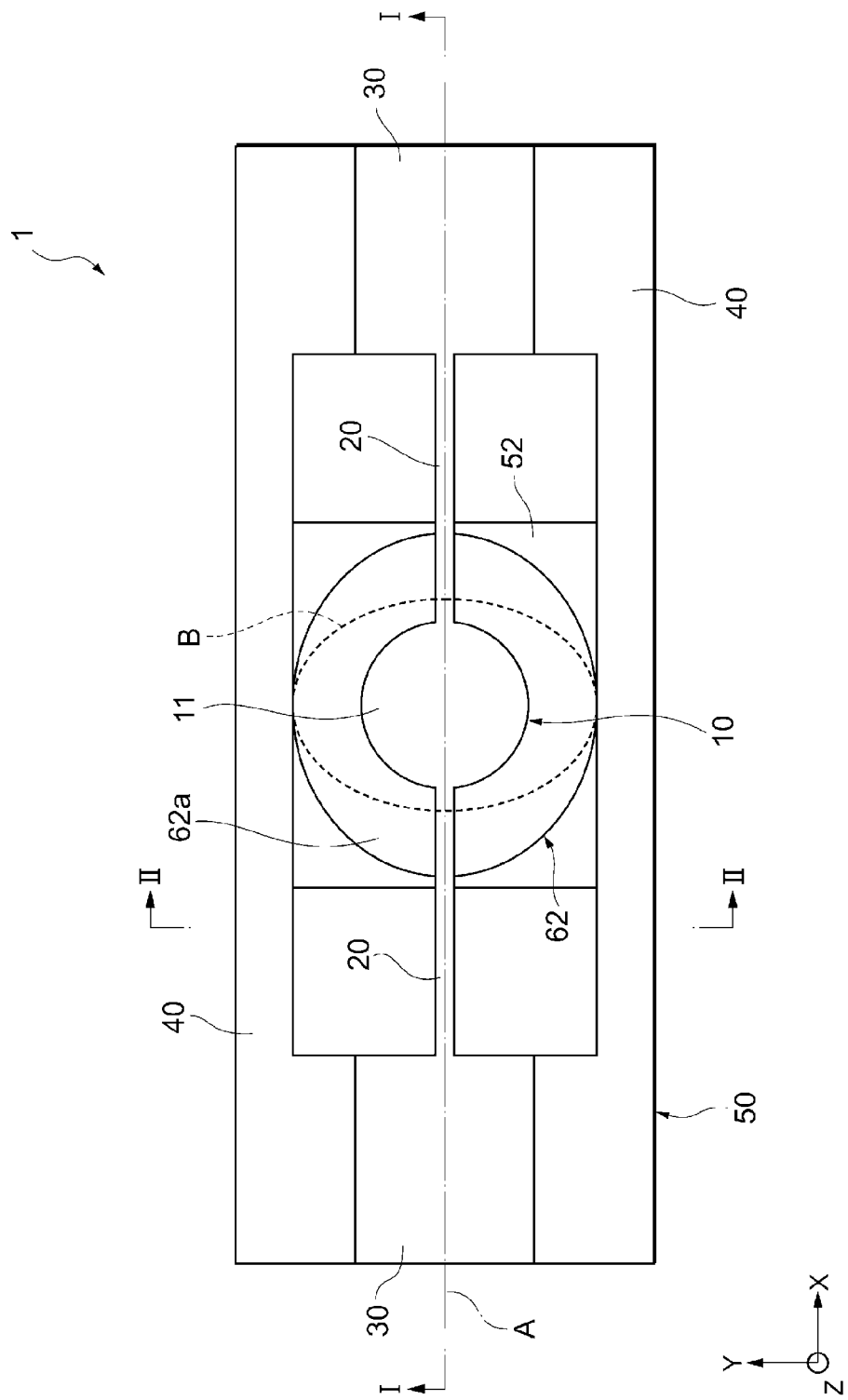
FIG. 1 is a plan view for explaining a configuration of an optical device according to an embodiment of the invention.

FIGS. 1 through 4 show an optical device according to an embodiment of the invention, wherein FIG. 1 is a plan view for explaining a configuration of the optical device according to the embodiment of the invention.

As shown in FIG. 1, the optical device 1 is provided with a movable plate 10, a pair of shaft members 20, a pair of fixing sections 30, a frame section 40, a holder member 50, and a coil 62. Light with diffusion of a normal distribution (a Gaussian distribution) is input to the optical device 1 from an external light source not shown. The light is distributed in the distribution range B shown in FIG. 1.

On an upper surface (one of the surfaces) of the movable plate 10, there is formed a metal film 11 disposed inside the distribution range B of the light and for reflecting the light. The metal film 11 corresponds to a light reflecting surface of the invention. The metal film 11 can be formed by executing a deposition process such as vacuum evaporation, sputtering, or metal foil bonding on the upper surface of the movable plate 10.

The pair of shaft members 20 supports the movable plate 10 with respect to the respective fixing sections 30 so that the movable plate 10 can swing around an axis A as a central axis of the shaft members 20. It should be noted that the shaft members 20 are preferably provided with elasticity. Thus, the torsional deformation described later becomes easy. The fixing sections 30 are respectively connected to the pair of shaft members 20, and fix both ends of an oscillating system constituted with the movable plate 10 and the shaft members 20. The movable plate 10, the shaft members 20, and the fixing sections 30 are formed integrally by, for example, etching a silicon substrate.

Although the movable plate 10, the shaft members 20, and the fixing sections 30 are formed integrally in the present embodiment, the invention is not limited thereto, but these constituents can also be formed separately. Further, although the movable plate 10 having a circular planar shape is described in the present embodiment, the invention is not limited thereto, but other shapes such as an ellipsoidal shape, a rectangular shape, or a polygonal shape can also be adopted providing the role required as the movable plate 10 of the optical device 1 is fulfilled.

The frame section 40 has notches not shown into which the fixing sections 30 are fitted. It is arranged that when the fixing sections 30 are fitted into the notches, the frame section 40 is automatically disposed so as to surround the periphery of the movable plate 10. It should be noted that it is preferable to set the dimensions of the notches so that the upper surfaces of the movable plate 10, the shaft members 20, and the fixing sections 30 and the upper surface of the frame section 40 are included in the same plane or in substantially the same plane.

Figure 2:
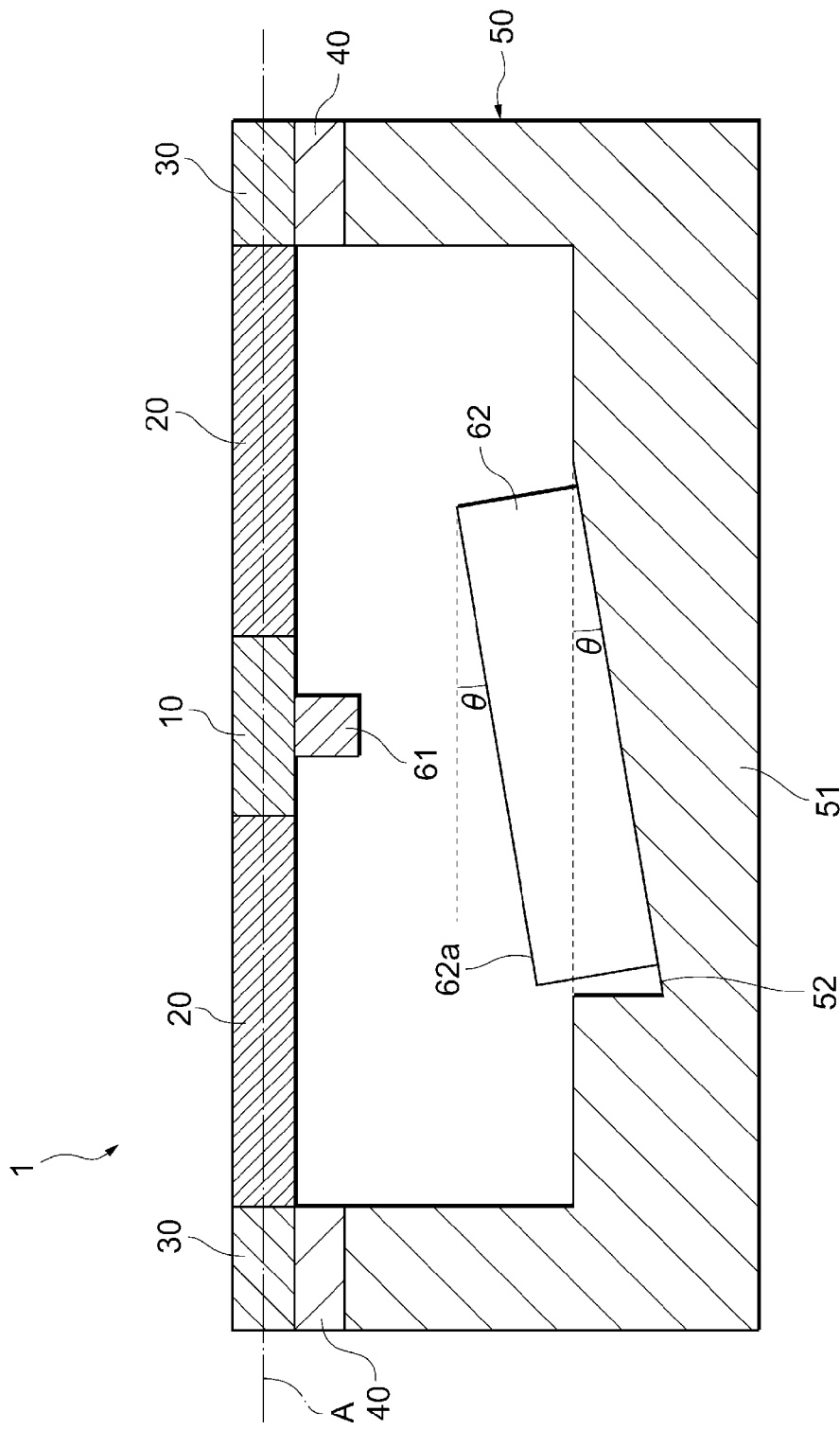
FIG. 2 is a cross-sectional diagram along the line I-I shown in FIG. 1.

FIG. 2 is a cross-sectional diagram along the line I-I shown in FIG. 1. As shown in FIG. 2, on the lower surface (the other of the surfaces) of the movable plate 10, there is bonded a permanent magnet 61 as a ferromagnetic member of the invention via an adhesive not shown. Further, in the plan view of the optical device 1, the permanent magnet 61 is magnetized in a direction (the Y-axis direction in FIG. 1) perpendicular to the axis A. In other words, the permanent magnet 61 has a pair of magnetic poles opposed to each other via the axis A and having respective polarities different from each other. It should be noted that the permanent magnet 61 can be magnetized with an angle with the axis A, or the direction along which the permanent magnet 61 is disposed can form an angle with the axis A.

As the material of the permanent magnet 61, the material obtained by magnetizing a hard magnetic material such as neodymium magnet, ferrite magnet, samarium-cobalt magnet, alnico magnet, or bond magnet can preferably be used. It should be noted that it is also possible to obtain the permanent magnet by magnetizing the hard magnetic material after providing the hard magnetic material to the movable plate 10.

Although in the present embodiment, the explanations are presented assuming that the permanent magnet 61 is a member separate from the movable member 10, the invention is not limited thereto, but the permanent magnet 61 can also be formed integrally with the movable plate 10. In this case, the permanent magnet 61 can be formed by executing a deposition process such as sputtering on the lower surface (the other of the surfaces) of the movable plate 10.

The support member 50 supports the frame section 40 from below, and is bonded to the frame section 40 via an adhesive not shown. Further, the support member 50 is provided with a substrate 51 forming a bottom portion of the optical device 1. On a part of the upper surface of the substrate 51, specifically in an area including the distribution range B of the light shown in FIG. 1, there is formed a tilted surface 52. The portion in the upper surface of the substrate 51 forming the bottom portion other than the tilted surface 52 is provided with a plane parallel to the movable plate 10.

Although in the present embodiment, the explanations are presented assuming that the support member 50 is a member separate from the frame section 40, the invention is not limited thereto, but the support member 50 can also be formed integrally with the frame section 40. Further, although in the present embodiment, it is arranged that the fixing sections 30 are fitted into the notches not shown of the frame section 40, the invention is not limited thereto, but the frame section 40 can be eliminated from the optical device 1. In this case, the fixing sections 30 are bonded to the support member 50 via an adhesive or the like.

The tilted surface 52 is a plane having a predetermined angle θ with a plane parallel to the movable plate 10, and has a normal vector (hereinafter referred to as a specified normal vector) with which the light input from the outside is reflected to the outside of a predetermined range. On the tilted surface 52, there is mounted the coil 62 at a position in the tilted surface 52 opposed to the movable plate 10 with a predetermined distance from the permanent magnet 61. Thus, similarly to the tilted surface 52, the upper surface 62*a* of the coil 62 forms a plane having a predetermined angle θ with a plane parallel to the movable plate 10, and therefore, has the specified normal vector described above. In general, since it is known that the incident angle and the reflection angle of the light are equal to each other with respect to the normal vector (the normal line) of the reflecting surface, it is possible to change the incident angle and the reflection angle of the light by changing the direction of the normal vector of the reflecting surface with respect to the incident light. Therefore, it becomes possible to reflect the incident light to the outside of the predetermined range by setting the angle formed between the light input from the outside and the normal vector of the reflecting surface, namely the incident angle of the light, to be an appropriate value.

It should be noted that the predetermined range, which the reflected light from the upper surface 62*a* of the coil 62 misses, preferably include a reflection range D of the light reflected by the movable plate 10 when the movable plate 10 swings around the axis A as described later. Further, it is further preferable that the range includes other optical devices such as mirrors or a screen (including a screen illuminated via the other optical devices, the mirrors and so on) including the reflection range D of the light. This is because the reflected light from the upper surface 62*a* of the coil 62 entering the range described above causes the stray light.

Here, the tilted surface 52 having the predetermined angle θ with the movable plate 10 can be obtained by executing, for example, anisotropic etching or cutting work using a machine on the upper surface of the substrate 51 parallel to the movable plate 10. Therefore, it becomes possible to use the tilted surface 52 and the upper surface 62*a* as the surfaces with the specified normal vector described above by setting the predetermined angle θ to be an appropriate value.

Although in the present embodiment the coil 62 is mounted on the tilted surface 52 of the substrate 51 to thereby form the upper surface 62*a* of the coil 62 as the plane having the predetermined angle θ with the plane parallel to the movable plate 10 having the specified normal vector described above, the invention is not limited thereto. For example, it is also possible that the cutting work using a machine or the like is executed on the upper surface of a magnetic core to thereby form a tilted surface having the predetermined angle θ with the plane parallel to the movable plate 10, and then a coil is provided on the tilted surface by a winding process, thereby forming the upper surface of the coil as a plane having the predetermined angle θ with the plane parallel to the movable plate 10 having the specified normal vector described above. In this case, it is not necessary to form the tilted surface 52 on the upper surface of the substrate 51.

Figure 3:
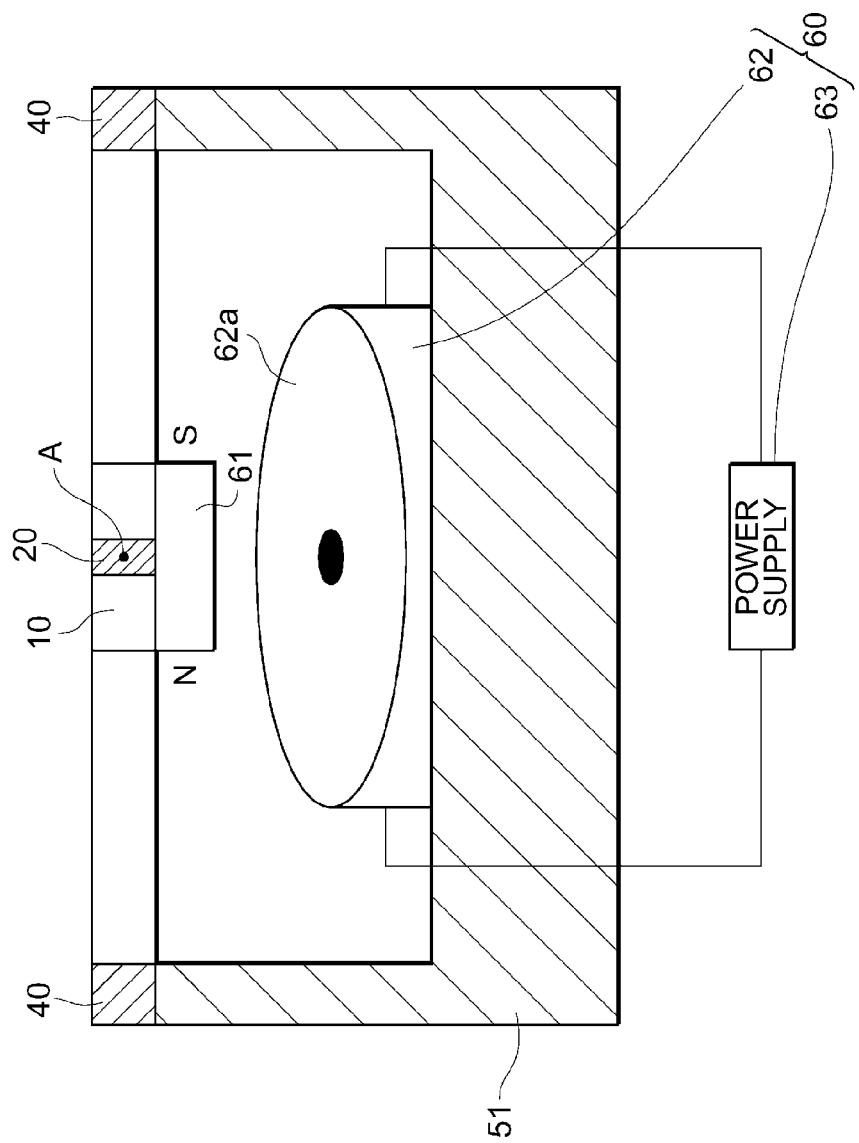
FIG. 3 is a cross-sectional diagram along the line II-II shown in FIG. 1.

FIG. 3 is a cross-sectional diagram along the line II-II shown in FIG. 1. It should be noted that in FIG. 3, the case in which the permanent magnet 61 is magnetized so that the left side thereof is the north pole and the right side thereof is the south pole is explained. A drive section 60 is for generating electromagnetic force between the drive section 60 and the permanent magnet 61 to thereby swing the movable plate 10 around the axis A. As shown in FIG. 3, the drive section 60 is configured including the coil 62, and an alternating current signal generator (a power supply) 63 electrically connected to the coil 62.

The coil 62 is supplied with an alternating current with a predetermined frequency from the alternating current signal generator (the power supply) 63. In response therewith, the coil 62 alternately generates a magnetic field directed upward (on the side of the movable plate 10) and a magnetic field directed downward. Thus, the movable plate 10 and the permanent magnet 61 are swung around the axis A while one of the pair of magnetic poles of the permanent magnet 61 comes closer to the coil 62 and the other thereof gets away from the coil 62 to thereby cause the torsional deformation of the shaft members 20.

The predetermined frequency of the alternating current to be supplied to the coil 62 is preferably set so as to be approximately equal to the frequency (the torsional resonant frequency) of the oscillating system constituted with the movable plate 10 and the shaft members 20. By making use of the resonance as described above, large deflection angle can be obtained with low power consumption when swinging the movable plate 10 around the axis A.

Although in the present embodiment the coil 62 and the alternating current signal generator (the power source) 63 are used as an example of the drive section 60, the invention is not limited thereto, but it is enough for the drive section 60 to be configured so as to generate the electromagnetic power between the drive section 60 and the ferromagnetic member to thereby make the movable plate 10 swing around the axis A.

Here, in the case in which the upper surface 62a of the coil 62 having the predetermined angle θ with the plane parallel to the movable plate 10 is tilted toward the direction (the Y-axis direction shown in FIG. 1) along which, for example, the permanent magnet 61 is magnetized, the distance between the upper surface 62a of the coil 62 and the north pole of the permanent magnet 61 and the distance between the upper surface 62a of the coil 62 and the south pole of the permanent magnet 61 become different from each other. As a result, the force (torque) acted on the north pole of the permanent magnet 61 and the force (torque) acted on the south pole of the permanent magnet 61 due to the magnetic field generated by the coil 62 become unequal. Therefore, it is preferable that the upper surface 62a of the coil 62 is tilted in a direction (the X-axis direction shown in FIG. 1) perpendicular to the direction (the Y-axis direction shown in FIG. 1) along which the permanent magnet 61 is magnetized as shown in FIG. 3.

It should be noted that since the upper surface 62a of the coil 62 is tilted with respect to the movable plate 10 swinging around the axis A, it is necessary to make the predetermined distance between the permanent magnet 61 and the coil 62 longer than ever before. However, even if the predetermined distance between the permanent magnet 61 and the coil 62 is made longer in order for tilting the upper surface 62a of the coil 62, the electrical power necessary to swing the movable plate 10 is hardly varied. Specifically, since the air resistance is reduced by making the predetermined distance between the permanent magnet 61 and the coil 62 longer, the Q-value in the case of driving the oscillating system constituted with the movable plate 10 and the shaft members 20 at the torsional resonant frequency becomes higher. As a result, there is very little increase in the power consumption due to the increase in the predetermined distance between the permanent magnet 61 and the coil 62.

Figure 4:
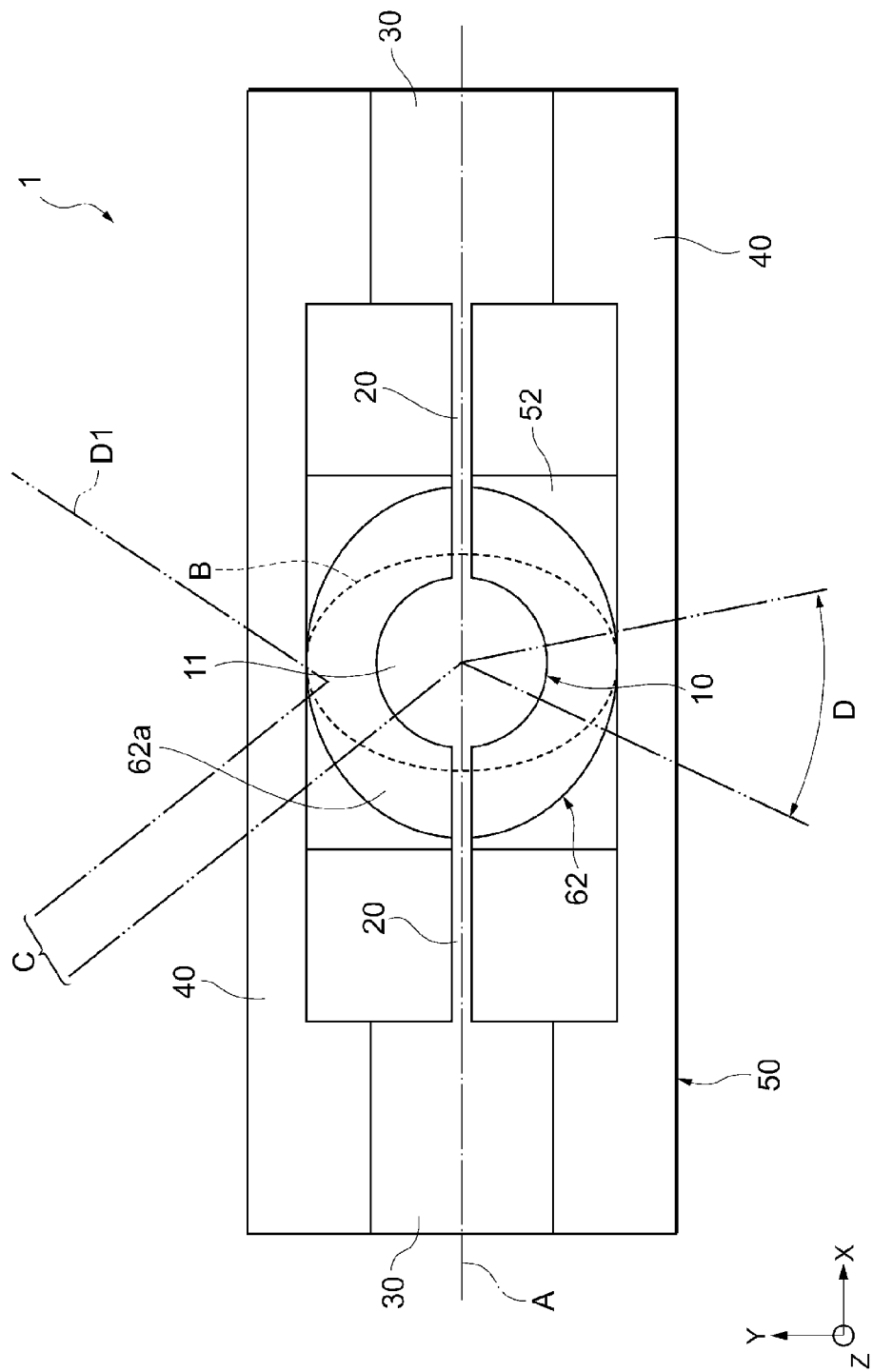
FIG. 4 is a plan view for explaining an example of the reflected light of the optical device according to the embodiment of the invention.

FIG. 4 is a plan view for explaining an example of the reflected light of the optical device according to the embodiment of the invention. As shown in FIG. 4, when the light C is input from the outside to the optical device 1, the light C input to the movable plate 10 is reflected to the reflection range D due to the swing of the movable plate 10 around the axis A. In contrast thereto, the light C input to the upper surface 62a of the coil 62 having the specified normal vector described above is reflected, as the reflected light D1, in a direction toward an area different from the reflection range D of the light due to the movable plate 10.

Although in the present embodiment the upper surface 62a of the coil 62 is shown as a portion included in the distribution range B of the light in the drive section 60, the invention is not limited thereto. As long as it is the portion included in the distribution range B of the light in the drive section 60, it can be a side surface of the coil 62 or the alternating current signal generator (the power supply) 63, for example. Further, although in the present embodiment the plane having the predetermined angle with the movable plate 10 is shown as the surface having the specified normal vector described above, the invention is not limited thereto. As long as it is a surface having the specified normal vector, it can be a curved surface, for example.

As described above, according to the optical device of the present embodiment, the portion inside the distribution range of the light in the drive section 60 is composed of a surface having the normal vector (the specified normal vector) with which the light input from the outside is reflected to the outside of the predetermined range. In general, since it is known that the incident angle and the reflection angle of the light are equal to each other with respect to the normal vector (the normal line) of the reflecting surface, it is possible to change the incident angle and the reflection angle of the light by changing the direction of the normal vector of the reflecting surface with respect to the incident light. Therefore, it becomes possible to reflect the incident light to the outside of the predetermined range by setting the angle formed between the light input from the outside and the normal vector of the reflecting surface, namely the incident angle of the light, to be an appropriate value. Thus, the stray light caused by the light input to the drive section 60 can be reduced.

Further, according to the optical device 1 of the present embodiment, the surface having the specified normal vector described above includes a plane having the predetermined angle with the movable plate 10. Here, the plane having the predetermined angle with the movable plate 10 can be obtained by executing, for example, anisotropic etching or cutting work using a machine on a surface parallel to the movable plate 10. Therefore, it becomes possible to use the plane as the surface having the specified normal vector described above by setting the predetermined angle to be an appropriate value. Thus, the surface having the specified normal vector described above can easily be formed in the portion of the drive section 60 inside the distribution range B of the light.

Further, according to the optical device 1 of the present embodiment, the drive section 60 includes the coil 62 disposed at the position opposed to the permanent magnet 61 with a predetermined distance therefrom and the alternating current signal generator 63 for applying the alternating current signal to the coil 62. Here, since the coil 62 is disposed at the position opposed to the permanent magnet 61, it is possible to efficiently generate the electromagnetic force between the coil 62 and the permanent magnet 61. Further, since the coil 62 is disposed with the predetermined distance from the permanent magnet 61, it becomes possible to dispose the coil 62 without interfering the swinging movement of the movable plate 10 even in the case in which the upper surface 62a of the coil 62 is tilted, for example, so as to have the predetermined angle θ with the movable plate 10.

Further, according to the optical device 1 of the present embodiment, since the upper surface 62a of the coil 62 is tilted in the direction perpendicular to the direction of the magnetic field of the permanent magnet 61, there is caused no substantial difference between the distance between the upper surface 62a of the coil 62 and the north pole of the permanent magnet 61, and the distance between the upper surface 62a of the coil 62 and the south pole of the permanent magnet 61, and thus the force (the torque) acted on the north pole and the south pole of the permanent magnet 61 due to the magnetic field generated by the coil 62 becomes substantially equal. Thus, it becomes possible to reduce the stray light caused by the light input to the drive section 60, and at the same time swing the movable plate 10 with low power consumption.

Further, according to the optical device 1 of the present embodiment, since the coil 62 is mounted on the tilted surface 52 of the substrate 51 having the specified normal vector described above, the upper surface 62a of the coil 62 also becomes the plane having the specified normal vector described above. Thus, the plane having the specified normal vector described above can easily be formed in the portion of the upper surface 62a of the coil 62 inside the distribution range B of the light.

Further, according to the optical device 1 of the present embodiment, since the predetermined range described above includes the reflection range D of the light reflected by the movable plate 10, the incident light input to the portion of the distribution range B of the light input from the outside in the drive section 60 is reflected to the outside of the reflection range D of the light reflected by the movable plate 10. In other words, the reflection range D of the light reflected by the movable plate 10 and the reflection range D1 of the light reflected by the drive section 60 do not overlap with each other. Thus, the possibility that the light input to the drive section 60 appears in the reflection range D of the light by the movable plate 10 as stray light can be reduced.

Optical Scanner

The optical device 1 described above is provided with the movable plate 10 having the metal film 11 as shown in FIG. 1, and therefore can preferably be applied to an optical scanner provided to an image forming apparatus such as a laser printer, a barcode reader, a confocal scanning laser microscopy, or an imaging display. It should be noted that the optical scanner according to the embodiment of the invention has substantially the same configuration as that of the optical device 1 described above, and therefore, the explanations therefor will be omitted.

As described above, according to the optical scanner of the present embodiment of the invention, the stray light caused by the light input to the drive section 60 can be reduced. Thus, the need for lowering the resolution for making the stray light less noticeable or lowering the contrast of the light input from the outside in optical devices of the related art can be eliminated. Therefore, it becomes possible to realize an optical scanner having superior optical characteristics capable of raising the resolution and raising the contrast of the light input from the outside compared to optical devices of the related art.

Image Forming Apparatus

Figure 5:
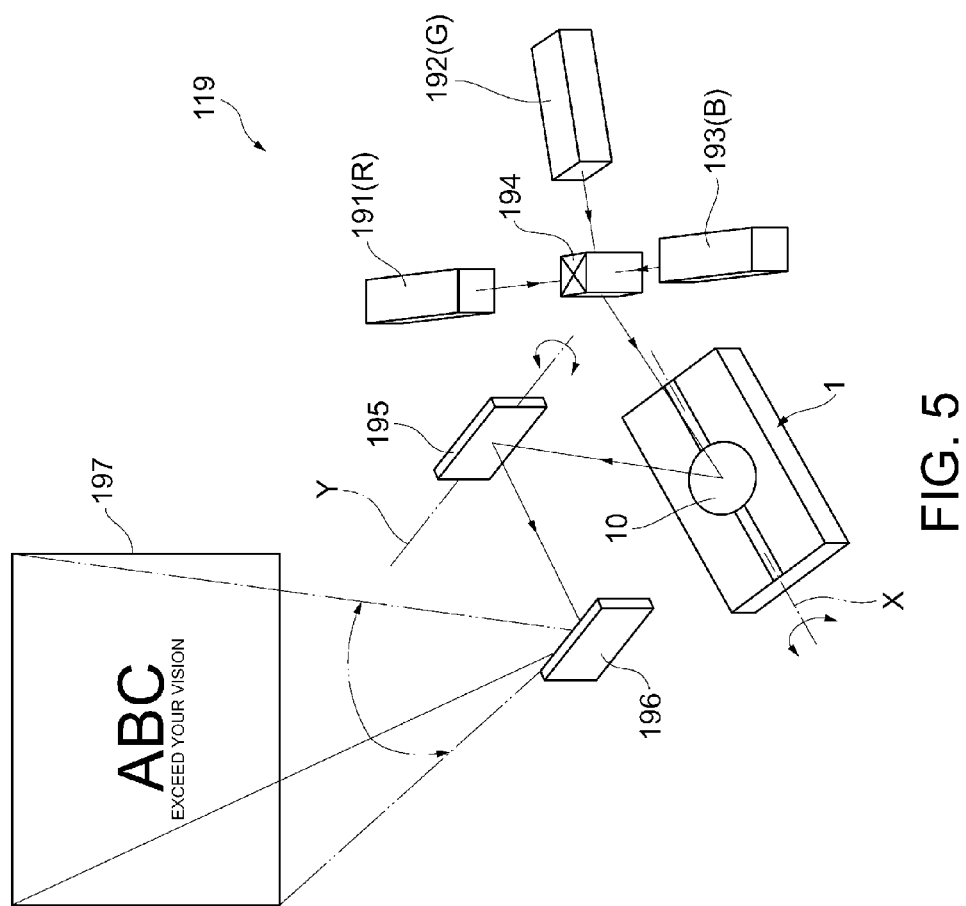
FIG. 5 is a schematic diagram showing an example of an image forming apparatus equipped with an optical scanner according to an embodiment of the invention.

Then, an image forming apparatus according to an embodiment of the invention will be explained with reference to FIG. 5. FIG. 5 is a schematic diagram for explaining an example of the image forming apparatus equipped with the optical scanner according to the embodiment of the invention.

The image forming apparatus (an imaging display) 119 shown in FIG. 5 is provided with the optical device 1 as the optical scanner, light sources 191, 192, 193 of three colors of red (R), green (G), and blue (B), a cross dichroic prism (an X prism) 194, a galvanometer mirror 195, a fixed mirror 196, and a screen 197.

In such an image forming apparatus 119, light beams of the respective colors are emitted from the light sources 191, 192, 193 to (the movable plate 10 of) the optical device 1 via the cross dichroic prism 194. In this case, the red light beam from the light source 191, the green light beam from the light source 192, and the blue light beam from the light source 193 are combined in the cross dichroic prism 194. Subsequently, the light beam (a composite light beam of the three colors) reflected by the movable plate 10 is reflected by the galvanometer mirror 195, and then further reflected by the fixed mirror 196, and then emitted on the screen 197.

On that occasion, the light beam reflected by the movable plate 10 is scanned (main scanning) in a lateral direction of the screen 197 due to the action (the swinging action of the movable plate 10 around the axis line X thereof). Further, the light beam input to the portion other than the movable plate 10 is reflected toward the outside of the predetermined range, namely so as to miss the galvanometer mirror 195 and the screen 197. Thus, it becomes possible to reduce the possibility that the light beam input to the drive section 60 shown in FIG. 3 appears on the galvanometer mirror 195 and the screen 197 as stray light.

In contrast, the light beam reflected by the movable plate 10 is scanned (sub-scanning) in the vertical direction of the screen 197 due to the pivot movement of the galvanometer mirror 195 around the axis line Y thereof. Further, the intensity of each of the light beams output from the light sources 191, 192, 193 of the respective colors varies in accordance with image information received from a host computer not shown.

As described above, according to the image forming apparatus 119 of the present embodiment of the invention, since the optical scanner according to the embodiment of the invention described above is provided, the resolution can be raised and the contrast of the light input from the outside can also be raised compared to optical devices of the related art. Thus, it becomes possible to realize the image forming apparatus 119 having superior drawing characteristics capable of forming high-resolution and high-contrast images.

It should be noted that it is also possible to combine the constituents of the respective embodiments described above, or to replace some constituents thereof. Further, the configuration of the invention is not limited only to the embodiments described above, but various modifications can also be applied thereto within the scope or the spirit of the invention.

What is claimed is:

1. An optical device comprising:
   a movable plate disposed in a distribution range of light input from outside, and having a light reflecting surface adapted to reflect the light;
   a shaft member adapted to support the movable plate so that the movable plate can swing around a predetermined axis;
   a ferromagnetic member provided to the movable plate, the ferromagnetic member being a permanent magnet; and
   a drive section configured to generate electromagnetic force between the drive section and the ferromagnetic member to thereby swing the movable plate, the drive section including:
      a coil disposed at a position opposed to the permanent magnet with a predetermined distance from the permanent magnet, and
      an alternating current signal generator adapted to supply the coil with an alternating current signal,
   wherein a portion of the drive section, included in the distribution range of the light, is formed of a surface having a normal vector with which the light is reflected to outside of a predetermined range; and the surface having the normal vector includes a plane having a predetermined angle with the movable plate, the plane having the predetermined angle being tilted in a direction perpendicular to a direction of a magnetic field of the permanent magnet.

2. The optical device according to claim 1, further comprising:

a substrate including a plane having the normal vector, wherein the coil is mounted on the plane.

3. The optical device according to claim 1, wherein the predetermined range includes a reflection range of light reflected by the movable plate.

4. An optical scanner comprising:
the optical device according to claim 1.

5. An image forming apparatus comprising:
the optical scanner according to claim 4.

* * * * *